United States Patent
Kunou

(10) Patent No.: US 6,254,027 B1
(45) Date of Patent: Jul. 3, 2001

(54) WINDING MACHINE

(75) Inventor: Hitoshi Kunou, Iino-machi (JP)

(73) Assignee: Nittoku Engineering Kabushiki Kaisha, Saitama (JP)

( * ) Notice: Subject to any disclaimer, the term of this patent is extended or adjusted under 35 U.S.C. 154(b) by 0 days.

(21) Appl. No.: 09/559,308

(22) Filed: Apr. 27, 2000

(30) Foreign Application Priority Data

Apr. 28, 1999 (JP) .................................................. 11-121751

(51) Int. Cl.⁷ ................................................ H02K 15/085
(52) U.S. Cl. ................................... 242/432.4; 242/434.8; 242/445; 29/596
(58) Field of Search ............................ 242/432.2, 432.4, 242/432.5, 434.8, 433.1, 445, 445.1, 447.1, 437; 29/596, 605

(56) References Cited

U.S. PATENT DOCUMENTS

| | | | |
|---|---|---|---|
| 4,424,939 | * 1/1984 | Ohashi et al. | 242/434.8 |
| 4,877,193 | * 10/1989 | Vaniglia | 242/445.1 |
| 4,917,316 | * 4/1990 | Suzuki | 242/434.8 |
| 5,662,289 | * 9/1997 | Ujita et al. | 242/445 |
| 5,806,781 | * 9/1998 | Ujita et al. | 242/445 |
| 5,875,988 | * 3/1999 | Hashimoto | 242/434.8 |
| 5,964,429 | * 10/1999 | Burch et al. | 242/432.2 |
| 5,988,554 | * 11/1999 | Taka | 242/433.1 |
| 6,029,925 | * 2/2000 | Yano | 242/445.1 |
| 6,098,912 | * 8/2000 | Noji | 242/432.5 |

FOREIGN PATENT DOCUMENTS

| | | | |
|---|---|---|---|
| 8400007 | * 1/1984 | (JP) | 242/434.8 |
| 10-271774 | 10/1998 | (JP) . | |

* cited by examiner

Primary Examiner—Emmanuel M. Marcelo
(74) Attorney, Agent, or Firm—Rabin & Champagne, P.C.

(57) ABSTRACT

A winding machine, as a ball screw mechanism for moving a nozzle section (10) in three dimensional directions, comprises a lateral movement mechanism (20), a lengthwise movement mechanism (30), a vertical movement mechanism (40), and a nozzle lateral movement mechanism (50). The lateral movement mechanism (20) supports the lengthwise movement mechanism (30), and the lengthwise movement mechanism (20) supports the vertical movement mechanism (40) and the nozzle lateral movement mechanism (50) at the lengthwise movement mechanism (30). A support plate (12) of the nozzle section (10) is directly connected to a vertical movement member (44) of the vertical movement mechanism (40) via a rail (47) and a rail groove (12A) and directly connected to a lateral movement member (54) of the lateral movement mechanism (50) via a guide (57) and a sliding member (14).

16 Claims, 5 Drawing Sheets

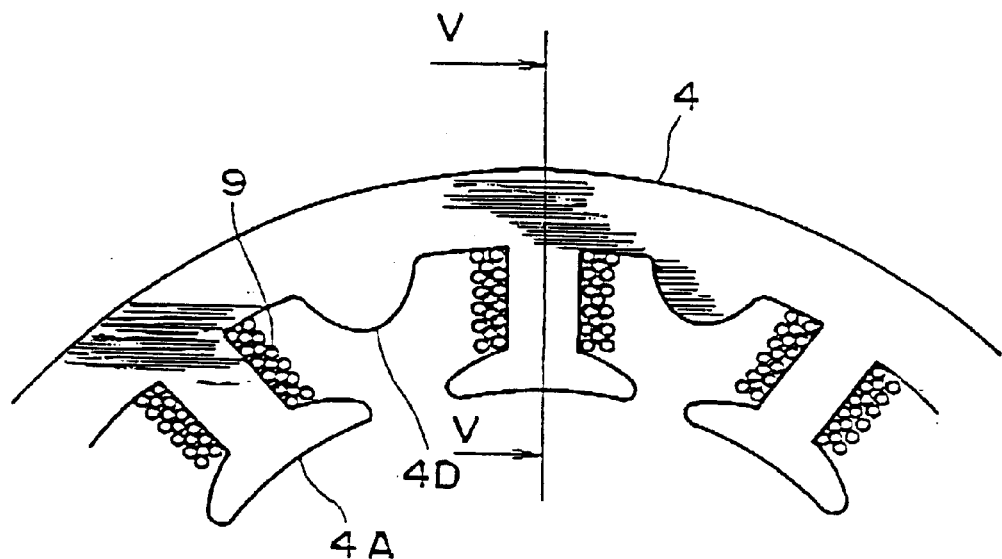
F I G. 4
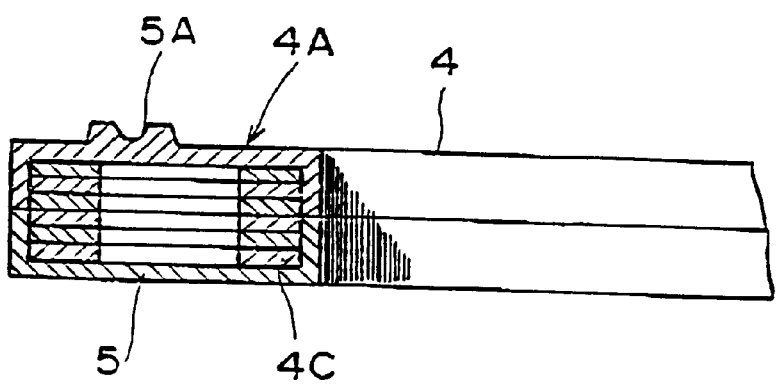
F I G. 5

WINDING MACHINE

FIELD OF THE INVENTION

The present invention relates to an improvement of a winding machine which is suitable for winding a stator of a motor.

BACKGROUND OF THE INVENTION

With regard to a winding machine for a stator of an inner rotor type motor, a servo mechanism of a winding machine which moves a nozzle in triaxial directions is disclosed in Japanese Patent Laid-Open Publication No. Hei 10-271774 published by the Japanese Patent Office in 1999. The servo mechanism moves in three dimensional directions a nozzle which feeds a wire for winding and precisely controls a position of a wire feeding end of the nozzle, thereby enabling well-ordered winding saving a high space factor.

The traxial servo mechanism is constituted such that each lengthwise, lateral, and vertical movement mechanism is piled one after another. Therefore, a movement mechanism situated at the lowest position has to move other upper movement mechanisms when it moves, whereby its movement becomes slow.

For example, the lengthwise movement mechanism supports the lateral movement mechanism in such a manner that the lateral movement mechanism can move lengthwise, and the lateral movement mechanism supports the vertical movement mechanism in such a manner that the vertical movement mechanism can move lateral. Further, the vertical movement mechanism supports a nozzle section in such a manner that the nozzle section can move vertically, whereby the nozzle section can move three dimensional directions. In this case, however, the lengthwise movement mechanism has to move the lateral movement mechanism and the vertical movement mechanism together with the nozzle section, and the lateral movement mechanism has to move the vertical movement mechanism together with the nozzle section. Therefore, a lengthwise movement of the nozzle caused by the lengthwise movement mechanism and a lateral movement of the nozzle caused by the lateral movement mechanism cannot be high-speed.

It therefore an object of the present invention to enable high precision and high speed winding of a winding machine.

SUMMARY OF THE INVENTION

In order to achieve the above object, this invention provides a winding machine which winds a winding section of a work in such a manner that a nozzle for feeding wire rods goes around the winding section, the winding machine comprising: a nozzle section which has a nozzle for guiding wire rods; at least three movement mechanisms for moving the nozzle section in three dimensional directions; and a connecting section for directly connecting two movement mechanisms out of the at least three movement mechanisms with the nozzle section, respectively, in such a manner that any one of the two movement mechanisms does not restrict movement of the nozzle section in a direction of movement of the other movement mechanism, wherein the two movement mechanisms are movably supported by the remaining movement mechanism.

A winding machine which winds a wire around a winding section of a work in such a manner that a nozzle for feeding wire rods goes around the winding section, the winding machine comprising; first and second movement mechanisms for moving the nozzle; a first connecting section for connecting the first movement mechanism and the nozzle in such a manner that relative displacement of the first movement mechanism and the nozzle in a first direction is allowed; and a second connecting section for connecting the second movement mechanism and the nozzle in such a manner that relative displacement of the second movement mechanism and the nozzle in a second direction being at right angles to the first direction is allowed.

The winding machine further comprises a third movement mechanism for moving the first movement mechanism and the second movement mechanism in a third direction which is at right angles to the first direction and the second direction.

The winding section has a horizontal center axis, and it is set such that the first direction and the second direction are at right angles to the horizontal center axis and the third direction is parallel to the horizontal center axis.

The winding section has a horizontal center axis, and the winding machine further comprises an actuator for moving the nozzle in a direction of a horizontal axis which is at right angles to the horizontal center axis.

It is set such that the first direction is a vertical direction and the second direction is a direction of a horizontal axis which is at right angles to the horizontal center axis.

The connecting section comprises a rail and a rail groove in which the rail is fitted.

The first connecting section comprises a rail and a rail groove in which the rail is fitted.

The connecting section comprises a guide having a U-shape cross-section and a sliding member which is fitted in an inside of the guide.

The second connecting section comprises a guide having a U-shape cross-section and a sliding member which is fitted in an inside of the guide.

The winding machine further comprises a work swinging mechanism for swinging the work in such a manner that an axis being parallel to a one of the first direction and the second direction is a swinging center.

The winding section has a horizontal center axis, and it is set such that the first direction is at right angles to the horizontal center axis and the second direction is parallel to the horizontal center axis.

The winding section has a horizontal center axis, and the winding machine further comprising an actuator for moving the nozzle in parallel with the horizontal center axs.

It is set such that the first direction is a vertical direction and the second direction is parallel to the horizontal center axis.

A winding machine which winds a wire around a winding section of a work by making a nozzle for feeding the wire go around the winding section, the winding section having a center axis, comprising: a two dimensional movement mechanism which moves on a horizontal plane; a vertical movement mechanism, fixed to the two dimensional movement mechanism, for moving the nozzle in a vertical direction; a lateral movement mechanism, fixed to the two dimensional movement mechanism, for moving the nozzle in a horizontal direction which is at right angles to the center axis; a first connecting section for connecting the vertical movement mechanism and the nozzle in such a manner that relative displacement of the vertical movement mechanism and the nozzle in the horizontal direction is allowed; and a second connecting section for connecting the lateral movement mechanism and the nozzle in such a manner that relative displacement of the lateral movement mechanism and the nozzle in the vertical direction is allowed.

A winding machine which winds a wire around a winding section of a work by making a nozzle for feeding the wire go around the winding section, the winding section having a center axis, comprising: a two dimensional movement mechanism which moves on a horizontal plane; a vertical movement mechanism, fixed to the two dimensional movement mechanism, for moving the nozzle in a vertical direction; a noble lengthwise movement mechanism for moving the nozzle in a direction of the center axis of the work; a first connecting section for connecting the vertical movement mechanism and the nozzle in such a manner that relative displacement of the vertical movement mechanism and the nozzle in a direction of the center axis is allowed; a second connecting section for connecting the nozzle lengthwise movement mechanism and the nozzle in such a manner that relative displacement of the nozzle lengthwise movement mechanism and the nozzle in a vertical direction is allowed; and a work swinging mechanism for swinging the work around a vertical axis.

BRIEF DESCRIPTION OF THE DRAWINGS

FIG. 4 an enlarged horizontal sectional view of a essential parts of a work according to the present invention.

FIG. 5 is a sectional view showing the essential parts of the work cut along the line V—V of FIG. 4.

DETAILED DESCRIPTION OF THE INVENTION

Figure 1:
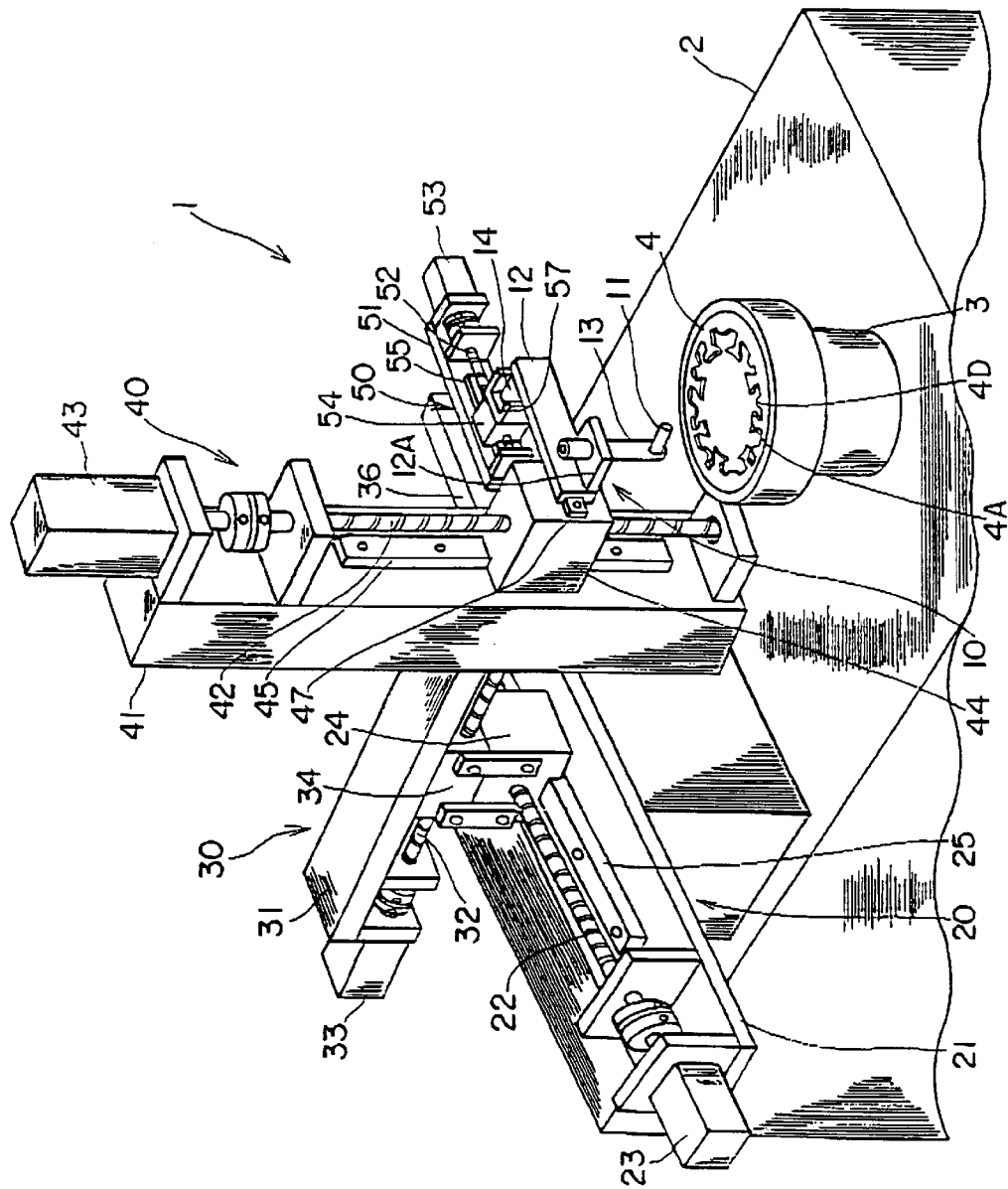
FIG. 1 is a perspective view showing a winding machine according to the present invention.

Referring to FIG. 1, a work fixture 3 is installed on a base 2 of a winding machine 1. A work 4 is retained at the work fixture 3. Wire 9 fed out from a nozzle 11 of a nozzle section 10 of a winding machine are wound one after another around a plurality of magnetic poles 4A formed at the work 4.

Next, referring to FIGS. 4 and 5, the work 4 is a ring shaped member which comprises a core 4C composed of a plurality of plate members layered and an insulator 5 covering the core 4C. The work 4 is provided with a plurality of Y magnetic poles 4A which project inward of the ring. The nozzle 11 winds wire around these magnetic poles 4A one after another, whereby a stator of an inner rotor type motor is produced. A crossover which crosses between winding coils of the respective magnetic poles 4A is housed in a guide groove 5A formed at the insulator 5.

Figure 2:
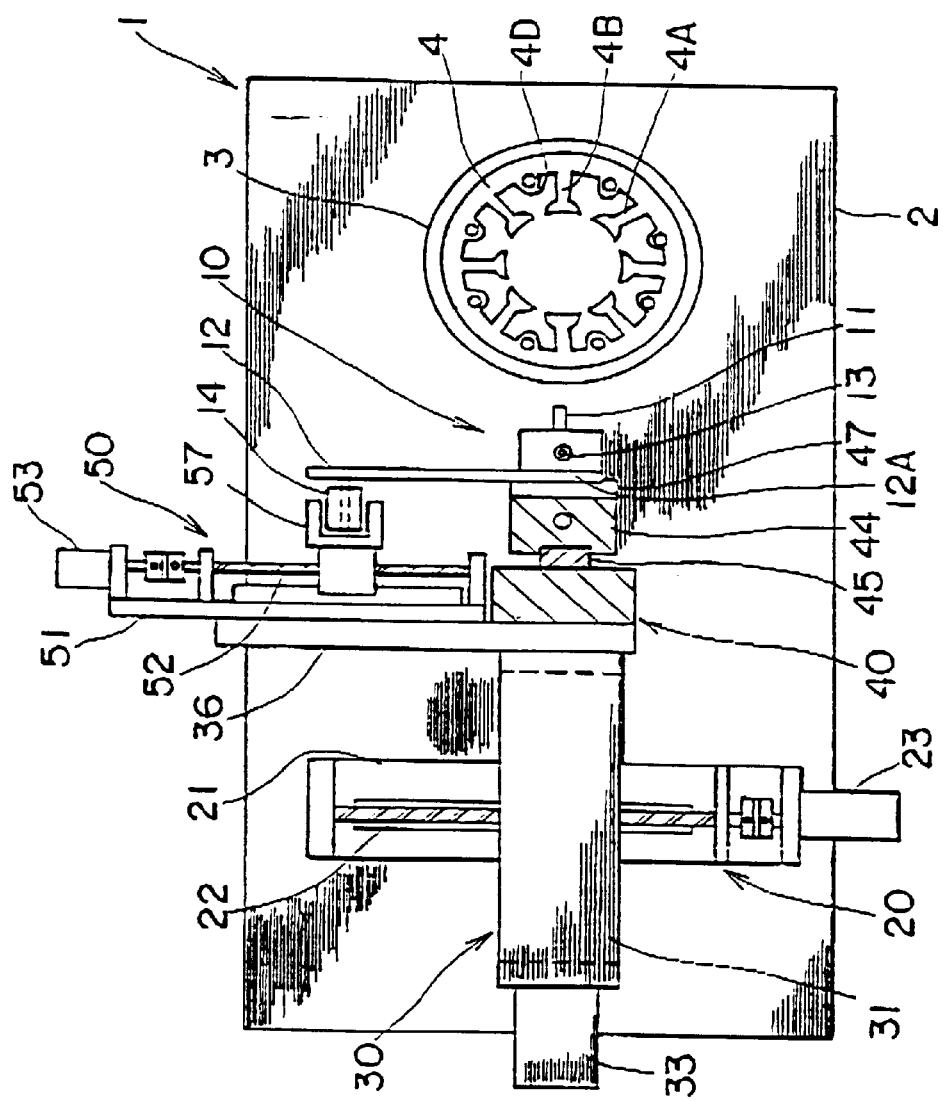
FIG. 2 is a plan view showing the winding machine.
Figure 3:
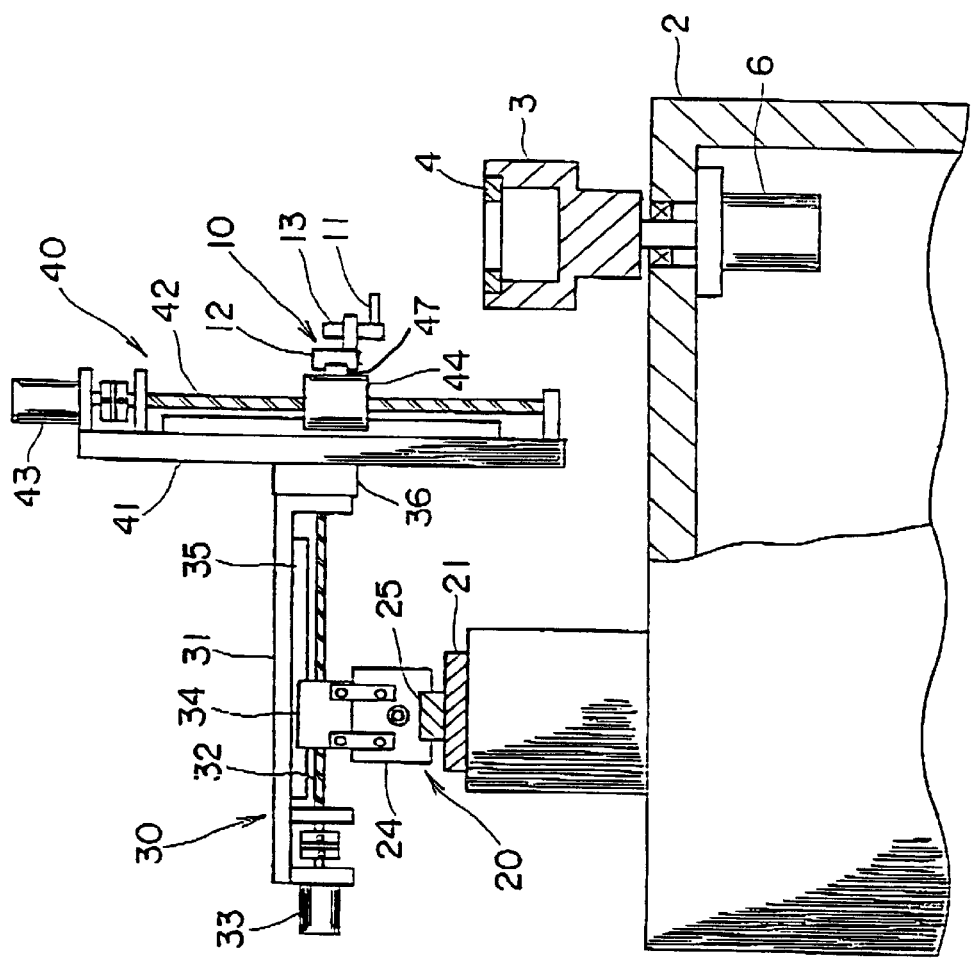
FIG. 3 is a side view of the winding machine including its partially sectional view.
Figure 6:
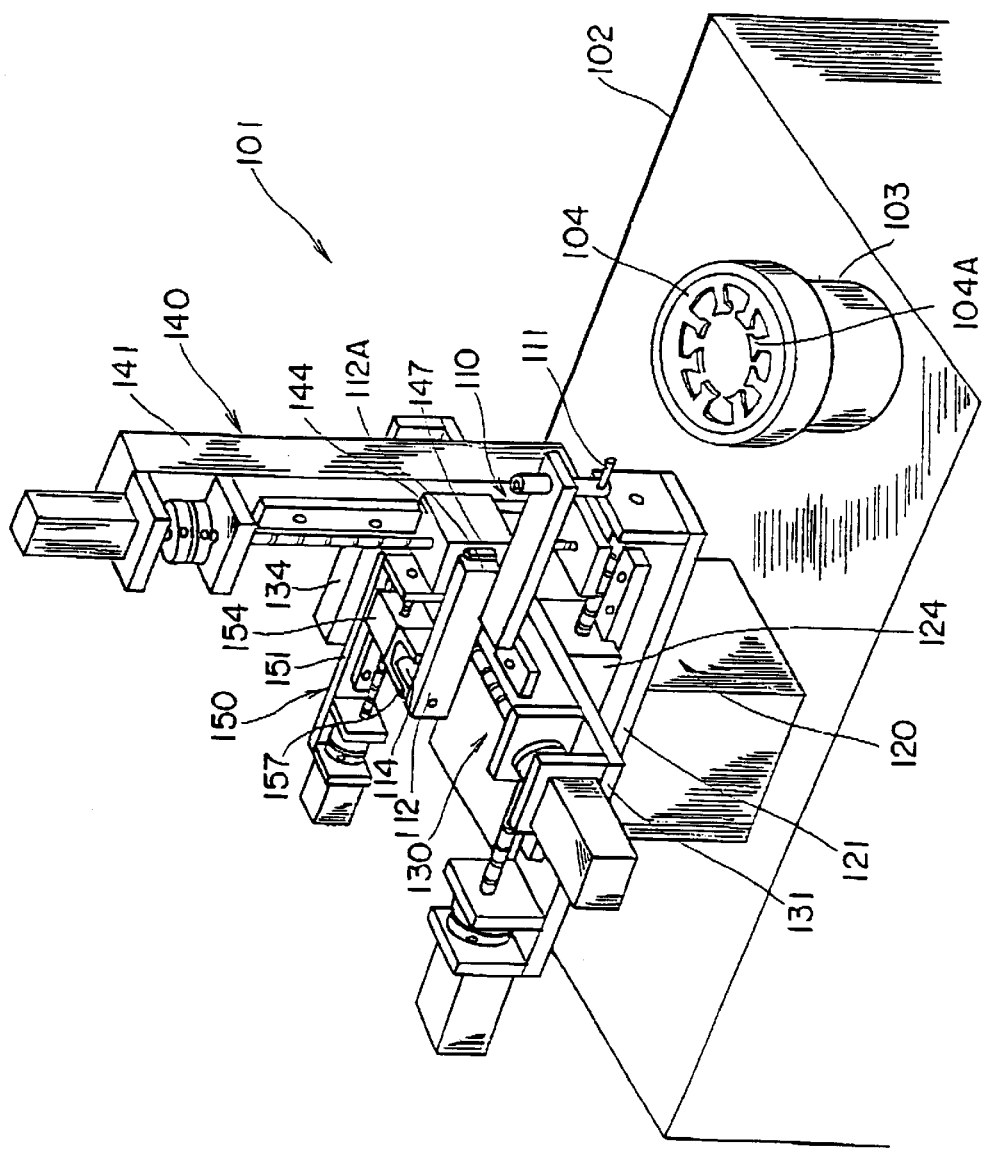
FIG. 6 is a perspective view showing a winding machine according to a second embodiment of the present invention.

Next, referring to FIGS. 2 and 3, the work fixture 3 retains an outer circumference of the work 4. The work fixture 3 is driven by a servomotor 6 and rotational displacement of the work fixture 3 around a rotation axis of the servomotor 6 takes place together with the work 4. Due to rotations of the work fixture 3, each of the magnetic poles 4A of the work 4 is arranged one after another on the front face of the nozzle section 10, namely, at the location represented by 4B in FIG. 2. Since the rotation of the work fixture 3 is caused by the servomotor 6, an angle of rotation can discretionally be set, whereby this indexing operation can easily cope with even a case that the magnetic poles 4A are arranged at irregular intervals.

The nozzle section 10 of the winding machine is provided with a support plate 12, a rail groove 12A which horizontally extends forward from the support plate 12, and a guide cylinder 13 retained by the rail groove 12A. The wire supplied from a wire source which is not shown in the drawings is inserted into the guide cylinder 13. The nozzle 11 is fixed on a lower side of the guide cylinder 13 in such a manner that a tip of the nozzle 11 is directed toward the work 4.

Referring to FIG. 1 again, the winding machine 1 as a three dimensional movement mechanism which moves the nozzle section 10 in three dimensional directions is provided with four movement mechanisms, such as a lateral movement mechanism 20, a lengthwise movement mechanism 30, a vertical movement mechanism 40, and a nozzle lateral movement mechanism 50. All of these four movement mechanisms are linear movement mechanisms which use a ball screw mechanism, respectively. The lengthwise movement mechanism 30, the vertical movement mechanism 40, and the nozzle lateral movement mechanism 50 move the nozzle section 10 and cause the nozzle 11 to carry out box motion around the magnetic poles 4A at the time of winding the work 4. On the other hand, the lateral movement mechanism 20 is not used in the winding work, but used, for example, when the nozzle section 10 is displaced far from a vicinity of the work 4 in a transverse direction.

The lateral movement mechanism 20 is provided with a frame 21 to be fixed to the base 2. A horizontal screw shaft 22 and a drive motor 23 for rotating the screw shaft 22 are inaed at the frame 21. A support member 24 is spirally engaged with the screw shaft 22. The support member 24 horizontally moves along a rail 25 fixed onto the frame 21 according to rotations of the screw shaft 22.

The lengthwise movement mechanism 30 is provided with a frame 31. The frame 31 is retained by a support member 24 of the lateral movement mechanism 20 via a support member 34. A horizontal screw shaft 32 which lies at right angles to the screw shaft 22 and a motor 33 for rotating the screw shaft 32 are installed at the frame 31. The support member 34 is spirally engaged with the screw shaft 32 and also fixed to the support member 24. The frame 31 is provided with a rail 35 shown in FIG. 3 which guides the support member 34. Due to the constitution described above, when the motor 33 rotates the screw shaft 32, the frame 31 moves in a direction of the screw shaft 32 relatively to the support member 34.

The vertical movement mechanism 40 and the nozzle lateral movement mechanism 50 move the nozzle section 10 vertically and laterally, respectively. A frame 41 of the vertical movement mechanism 40 and a frame 51 of the mozzle lateral movement mechanism 50 are fixed to a stationary plate 36 at the front of the frame 31 in such a manner that they adjoin each other right and left. Thus, the nozzle section 10 can move in three dimensional directions due to the combination of motion of the four movement mechanisms.

A drive motor 43 which rotates a vertical screw shaft 42 is installed at the frame 41 of the vertical movement mechanism 40. A vertical movement member 44 is spirally engaged with the screw shaft 42. The vertical movement member 44 moves vertically along a rail 45 resulting from rotations of the drive motor 43. The nozzle section 10 is retained by the vertical movement member 44 and moves vertically. The vertical movement member 44 and the nozzle section 10 are connected resulting from engagement of a rail 47 which is fixed to the front of the vertical movement member 44 and extends in a horizontal direction, and the rail groove 12A which is formed at the bark of the support plate 12 of the noble section 10. The nozzle section 10 moves in a vertical direction together with the vertical movement member 44 due to the vertical movement mechanism 40 and optionally moves in a horizontal direction along the rail 47.

A screw shaft 52 parallel to the screw shaft 22, a rail 55, and a motor 53 which rotates the screw shaft 52 are installed at the frame 51 of the nozzle lateral movement mechanism 50 which is fixed to the stationary plate 36. A lateral movement member 54 is spiral engaged with the screw shaft 52. The lateral movement member 54 moves in a horizontal direction along the rail 55 according to rotations of the screw shaft 52. A cylindrical sliding member 14 projects from an end of the support plate 12 of the nozzle section 10. On the other hand, a guide 57 having a U-shape cross-section is fixed to the front of the lateral movement member 54. The sliding member 14 is fitted in the inside of the guide 57. The sliding member 14 moves along the screw shaft 52 together with the guide 57 due to displacement of the guide 57 in a direction of the screw shaft 52. However, the sliding member 14 and the guide 57 are optionally displaced in a vertical direction relatively to each other.

As described above, the vertical movement mechanism 40 and the nozzle section 10 are connected via the rail 47 and the rail groove 12A, and the nozzle lateral movement mechanism 50 and the node section 10 are connected via the guide 57 and the sliding member 14. Thus, each of the movement mechanisms 40 and 50 can move the nozzle section 10 without interfering to each other and supporting the mutual weight. Therefore, the vertical movement mechanism 40 and the nozzle lateral movement mechanism 50 can vertically and laterally drive the note section 10 at a high speed, and high speed box motion of the nozzle 11, which is required at the time of winding the work 4, can be realized.

The rail groove 12A and the rail 47 are set to have sufficient length so that the engagement of the rail groove 12A and the rail 47 is not disconnected even though the nozzle section 10 makes a stroke up to either of right and left stoke ends due to the nozzle lateral movement mechanism 50. The sliding member 14 is detachable upward or downward from the guide 57 of the nozzle lateral movement mechanism 50. However, length of the guide 57 in a vertical direction is set so that the sliding member 14 is not detached from the guide 57 at least within a range of the stroke of the nozzle section 10 during winding work.

When the winding work is performed using the winding machine, the work 4 is first installed at the work fixture 3 and the wire 9 is inserted into the nozzle 11. Next, by the motion of the lateral movement mechanism 20, the lengthwise movement mechanism 30, and the vertical movement mechanism 40, the nozzle section 10 is moved to the inside of a circle of the work 4 and an end of the wire 9 fed out from the nozzle 11 is held by a chuck mechanism which is not shown in the drawings.

Next, by a combination of the motion of the vertical movement mechanism 40 and the nozzle lateral movement mechanism 50, a wire feeding end of the nozzle 11 is revolved around the magnetic pole 4B shown in FIG. 2 which is an object of winding and wire is wound around the magnetic pole 4B. Further, the lengthwise movement mechanism 30 retracts the nozzle 11 by a distance equivalent to a width of the wire in parallel with the center axis of the magnetic pole 4B every time the wire is wounded around the magnetic pole 4B, whereby the wire is wounded in a well-ordered manner around the magnetic pole 4B from the base end to the front end. Such well-ordered winding is performed up to the predetermined number of winding.

Since the lengthwise movement mechanism 30 together with the nozzle section 10 bears the weight of the vertical movement mechanism 40 and the nozzle lateral movement mechanism 50, there is a limit to the high speed motion. However, the lengthwise movement mechanism 30 only advances or retracts the nozzle 11 while winding. Thus, high speed motion is not required, thereby exerting no influence on efficiency of winding.

After the completion of winding a single magnetic pole 4B, holding of an end of the wire by the chuck mechanism is released and rotational displacement of the work fixture 3 is caused by the servomotor 6. A magnetic pole 4A to be wound next is arranged at the front of the nozzle 11 as a magnetic pole 4B which is a new object of winding, and then it is wound in a procedure similar to the above. Incidentally, a wire lies between the magnetic pole 4A already wound and the magnetic pole 4B to be wound passes through a guide groove 5A. It is preferable that a convex section 4D is provided between the magnetic poles 4A of the work 4 and a crossover between the magnetic poles 4A is fastened to a linkage pin which is fixed to the convex section 4D. It is also preferable that the nozzle section 10 is provided with a mechanism for turning the nozzle 11 so as to carry out the linkage work.

When winding of each magnetic pole 4A of the work 4 is completed in the manner described above, a winding start end and a winding finish end of the wire are cut to prescribed length. Here, the winding of the work 4 is completed.

Next, a second embodiment of the present invention will be described with reference to Fig, 6.

In this embodiment, a lengthwise movement mechanism 120, a lateral movement mechanism 130, a vertical movement mechanism 140, and a nozzle lengthwise movement mechanism 150 are provided as movement mechanisms for moving a nozzle section 110 in three dimensional directions. In this case, the nozzle section 110 is driven in a vertical direction by the vertical movement mechanism 140 and driven in a lengthwise direction by the nozzle lengthwise movement mechanism 150. Further, a servo motor, which is not shown in the drawings, is provided as a work sliding mechanism for swinging the work 104 around a vertical axis, namely, around a center axis of the work 104.

In winding work, by a combination of vertical motion of the vertical movement mechanism 140 and swinging motion of the work 104, box motion for winding a wire rod to an outer circumference of a magnetic pole 104A is carried out. Further, the nozzle lengthwise movement mechanism 150 advances or retracts the nozzle 11. The nozzle fixture 103 is rotated by a servomotor which is not shown in the drawings.

The lengthwise movement mechanism 120 moves a lengthwise movement member 124 in a lengthwise direction of a work 104 with respect to a frame 121 using the ball screw mechanism. The frame 121 is fixed to a base 102. A frame 131 of the lateral movement mechanism 130 is fixed to the lengthwise movement member 124. The lateral movement mechanism 130 moves a lateral movement member 134 horizontally to the frame 131 using the ball screw mechanism.

A frame 141 of the vertical movement mechanism 140 and a frame 151 of the nozzle lengthwise movement mechanism 150 are fixed to the lateral movement member 134 of the lateral movement mechanism 130 in such a manner that the frame 141 and the frame 151 are lined up in a lengthwise direction. The vertical movement mechanism 140 moves a vertical movement member 144 vertically to the frame 141. The nozzle lengthwise movement mechanism 150 moves a lengthwise movement member 154 lengthwise to the frame 151 using the ball screw mechanism.

A support plate 112 of the noble section 110 extends in a lengthwise direction. A rail 147 fixed to the vertical movement member 144 is engaged with a rail groove 112A formed on the support plate 112. Further, a cylindrical sliding member 114 fixed at the rear end of the support plate 112 is fitted in the inside of a U guide 157 which is fixed to a lengthwise movement member 154. Due to such constitution, the vertical movement mechanism 140 and the nozzle lengthwise movement mechanism 150 can move the nozzle section 110 without interfering to each other and supporting the mutual weight. Further, if the work 104 and the work fixture 103 are relatively lightweight, high speed rotary motion of the work 104 will be realized. Therefore, by a combination of these motions, it is possible to carry out very high speed winding operation including advancing and retracting operation of the nozzle 11. As described above, if the work 104 and the work fixture 103 are relatively lightweight, any convex section or the like is not provided between the magnetic poles 104A of the work 104, and it does not cause any trouble to substitute rotary motion of the work 104 for lateral motion of a nozzle 111, this embodiment will be effective in realizing high speed winding operation.

The embodiments of this invention in which an exclusive property or privilege is claimed are defined as follows:

What is claimed is:

1. A winding machine which winds a winding section of a work in such a manner that a nozzle for feeding wire rods goes around the winding section, the winding machine comprising:

a nozzle section which has a noble for guiding wire rods;

at least three movement mechanisms for moving the nozzle section in three dimensional directions; and a connecting section for directly connecting two movement mechanisms out of the at least three movement mechanisms with the nozzle section, respectively, in such a manner that any one of the two movement mechanisms does not restrict movement of the nozzle section in a direction of movement of the other movement mechanism, wherein the two movement mechanisms are movably supported by the remaining movement mechanism.

2. The winding machine according to claim 1, wherein the connecting section comprises a rail and a rail groove in which the rail is fitted.

3. The winding machine according to claim 1, wherein the connecting section comprises a guide having a U-shape cross-section and a sliding member which is fitted in an inside of the guide.

4. A winding machine which winds a wire around a winding section of a work in such a manner that a nozzle for feeding wire rods goes around the winding section, the winding machine comprising:

first and second movement mechanisms for moving the nozzle in second and first directions, respectively;

a first connecting section for connecting the first movement mechanism and the nozzle in such a manner that relative displacement of the first movement mechanism and the nozzle in the first direction is allowed; and a second connecting section for connecting the second movement mechanism and the nozzle in such a manner that relative displacement of the second movement mechanism and the nozzle in the second direction being at right angles to the first direction is allowed.

5. The winding machine according to claim 4, the winding machine further comprising a third movement mechanism for moving the first movement mechanism and the second movement mechanism in a third direction which is at right angles to the first direction and the second direction.

6. The winding machine according to claim 5, wherein the winding section has a horizontal center axis, and it is set such that the first direction and the second direction are at right angles to the horizontal center axis and the third direction is parallel to the horizontal center axis.

7. The winding machine according to claim 5, wherein the winding section has a horizontal center axis, and the winding machine further comprises an actuator for moving the nozzle in a direction of a horizontal axis which is at right angles to the horizontal center axis.

8. The winding machine according to claim 7, wherein it is set such that the first direction is a vertical direction and the second direction is a direction of a horizontal axis which is at right angles to the horizontal center axis.

9. The winding machine according to claim 4, wherein the first connecting section comprises a rail and a rail groove in which the rail is fitted.

10. The winding machine according to claim 4, wherein the second connecting section comprises a guide having a U-shape cross-section and a sliding member which is fitted in an inside of the guide.

11. The winding machine according to claim 4, the winding machine further comprising a work swinging mechanism for swinging the work in such a manner that an axis being parallel to a one of the first direction and the second direction is a swinging center.

12. The winding machine according to claim 11, wherein the winding section has a horizontal center axis, and it is set such that the first direction is at right angles to the horizontal center axis and the second direction is parallel to the horizontal center axis.

13. The winding machine according to claim 11, wherein the winding section has a horizontal center axis, and the winding machine further comprising an actuator for moving the nozzle in parallel with the horizontal center axis.

14. The winding machine according to claim 13, wherein it is set such that the first direction is a vertical direction and the second direction is parallel to the horizontal center axis.

15. A winding machine which winds a wire around a winding section of a work by making a nozzle for feeding the wire go around the winding section, the winding section having a center axis, comprising:

a two dimensional movement mechanism which moves on a horizontal plane;

a vertical movement mechanism, fixed to the two dimensional movement mechanism, for moving the nozzle in a vertical direction;

a lateral movement mechanism, fixed to the two dimensional movement mechanism, for moving the nozzle in a horizontal direction which is at right angles to the center axis;

a first connecting section for connecting the vertical movement mechanism and the nozzle in such a manner that relative displacement of the vertical movement mechanism and the nozzle in the horizontal direction is allowed; and a second connecting section for connecting the lateral movement mechanism and the nozzle in such a manner that relative displacement of the lateral movement mechanism and the nozzle in the vertical direction is allowed.

16. A winding machine which winds a wire around a winding section of a work by making a nozzle for feeding the wire go around the winding section, the winding section having a center axis, comprising:
- a two dimensional movement mechanism which moves on a horizontal plane;
- a vertical movement mechanism, fixed to the two dimensional movement mechanism, for moving the nozzle in a vertical direction;
- a nozzle lengthwise movement mechanism for moving the nozzle in a direction of the center axs of the work;
- a first connecting section for connecting the vertical movement mechanism and the nozzle in such a manner that relative displacement of the vertical movement mechanism and the nozzle in a direction of the center axis is allowed;
- a second connecting section for connecting the nozzle lengthwise movement mechanism and the nozzle in such a manner that relative displacement of the nozzle lengthwise movement mechanism and the nozzle in a vertical direction is allowed; and
- a work swinging mechanism for swinging the work around a vertical axis.

* * * * *